US007218206B2

(12) United States Patent
Johnson et al.

(10) Patent No.: US 7,218,206 B2
(45) Date of Patent: May 15, 2007

(54) AUTOMOTIVE LATCH DEBUG AND DIAGNOSTIC USER INTERFACE

(75) Inventors: Curtis B. Johnson, Freeport, IL (US); Peter Suknaich, Belvidere, IL (US)

(73) Assignee: Honeywell International Inc., Morristown, NJ (US)

(*) Notice: Subject to any disclaimer, the term of this patent is extended or adjusted under 35 U.S.C. 154(b) by 148 days.

(21) Appl. No.: 10/824,553

(22) Filed: Apr. 14, 2004

(65) Prior Publication Data

US 2005/0234657 A1 Oct. 20, 2005

(51) Int. Cl.
*B60R 25/10* (2006.01)
*B60R 25/00* (2006.01)
*G06F 19/00* (2006.01)
*G06F 7/00* (2006.01)

(52) U.S. Cl. ................. 340/426.28; 340/5.7; 340/5.71; 340/5.72; 340/5.773; 701/31; 701/36

(58) Field of Classification Search ........... 340/426.28, 340/5.7, 5.71, 5.72, 5.73, 686.1; 701/31, 701/36
See application file for complete search history.

(56) References Cited

U.S. PATENT DOCUMENTS 5,765,884 A 6/1998 Armbruster ................. 292/216
5,975,596 A 11/1999 Rogers, Jr. et al. ......... 292/216
6,007,118 A 12/1999 Arabia, Jr. et al. ......... 292/216
6,167,255 A * 12/2000 Kennedy et al. ......... 455/414.1
6,191,785 B1 2/2001 Bertram et al. ............. 345/341
6,208,340 B1 3/2001 Amin et al. ................ 345/339
6,335,745 B1 1/2002 Amro et al. ................ 345/835
6,346,954 B1 2/2002 Chu et al. ................... 345/764
6,441,512 B1 8/2002 Jakel et al. ................ 307/10.2
6,474,706 B1 11/2002 Kalsi .......................... 292/216
6,496,844 B1 12/2002 Hetheringon et al. ....... 707/536
6,511,107 B2 1/2003 Barczynski et al. ........ 292/216
6,520,548 B1 2/2003 Fisher et al. ................ 292/201
6,568,722 B2 5/2003 Raffelsiefer et al. ........ 292/216
6,575,507 B2 6/2003 Reddmann .................. 292/216
6,601,883 B1 8/2003 Kalsi .......................... 292/216
6,785,595 B2 * 8/2004 Kominami et al. ........... 701/36
2002/0125994 A1 9/2002 Sandau ...................... 340/5.62
2002/0180274 A1 12/2002 Suman ...................... 307/10.2
2003/0043021 A1 3/2003 Chung ....................... 340/5.71
2003/0182863 A1 10/2003 Mejean et al. ................. 49/26
2005/0035848 A1 * 2/2005 Syed et al. ................ 340/5.72

* cited by examiner

*Primary Examiner*—Julie Bichngoc Lieu
(74) *Attorney, Agent, or Firm*—Kermit D. Lopez; Luis M. Ortiz; Matthew F. Lambrinos

(57) ABSTRACT

Diagnostic data associated with a latch can be generated in response to automatically analyzing the latch. A graphical user interface is provided for graphically displaying the diagnostic data within a display area thereof. Additionally, a communications link between the graphical user interface and the latch can be implemented over which latch operational and functionality feedback information is communicated to the latch, in response to user input provided to the graphical user interface. The latch can be automatically analyzed in response to user input provided through the graphical user interface. Additionally, the latch can be automatically analyzed during latch operations thereof.

12 Claims, 6 Drawing Sheets

AUTOMOTIVE LATCH DEBUG AND DIAGNOSTIC USER INTERFACE

TECHNICAL FIELD

Embodiments are generally related to door latch assemblies, including door latching mechanisms utilized in automobiles and other vehicles. Embodiments are also related to techniques for automatically and remotely diagnosing and debugging vehicle door latches. Embodiments are additionally related to graphical user interfaces and data-processing systems.

BACKGROUND OF THE INVENTION

Latching mechanisms are utilized in a variety of commercial and industrial applications, such as automobiles, airplanes, trucks, and the like. For example, an automotive closure, such as a door for an automobile passenger compartment, is typically hinged to swing between open and closed positions and conventionally includes a door latch that is housed between inner and outer panels of the door. The door latch functions in a well-known manner to latch the door when it is closed and to lock the door in the closed position or to unlock and unlatch the door so that the door can be opened manually.

The door latch can be operated remotely from inside the passenger compartment by two distinct operators—a sill button or electric switch that controls the locking function and a handle that controls the latching function. The door latch is also operated remotely from the exterior of the automobile by a handle or push button that controls the latching function. A second distinct exterior operator, such as a key lock cylinder, may also be provided to control the locking function, particularly in the case of a front vehicle door. Each operator is accessible outside the door structure and extends into the door structure where it is operatively connected to the door latch mechanism by a cable actuator assembly or linkage system located inside the door structure.

Vehicles, such as passenger cars, are therefore commonly equipped with individual door latch assemblies which secure respective passenger and driver side doors to the vehicle. Each door latch assembly is typically provided with manual release mechanisms or lever for unlatching the door latch from the inside and outside of the vehicle, e.g. respective inner and outer door handles. In addition, many vehicles also include an electrically controlled actuator for remotely locking and unlocking the door latches.

One of the problems inherent with conventional latching mechanisms is that such devices are increasingly becoming complicated due to the addition of on-board electronics. Current automotive latches are therefore becoming increasingly complex and intelligent. In order to perform latch diagnostics and/or active debugging, a non-invasive system and/or technique is required. Such systems and techniques, however, have been successfully implemented to date.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved latch control and diagnostic mechanism.

It is another aspect of the present invention to provide for improved latching systems and methods for use in automobiles and other vehicles.

It is a further aspect of the present invention to provide for a graphical user interface, which permits a user to acquire latch diagnostic data and perform latch debugging operations.

The aforementioned aspects of the invention and other objectives and advantages can now be achieved as described herein. A latch diagnostic method, system, and program product are disclosed. Diagnostic data associated with a latch can be generated in response to automatically analyzing the latch. A graphical user interface is provided for graphically displaying the diagnostic data within a display area thereof. Additionally, a communications link between the graphical user interface and the latch can be implemented over which latch operational and functionality feedback information is communicated to the latch, in response to user input provided to the graphical user interface. The latch can be automatically analyzed in response to user input provided through the graphical user interface. Additionally, the latch can be automatically analyzed during latch operations thereof.

The diagnostic data is generally composed of latch functionality and operational information. The graphical user interface thus facilitates the viewing of latch internal electrical functionality and status data. The latch itself, including functionality and operations thereof, can be modified and improved. in response to communicating latch operational and functionality feedback information to the latch over the communications link from the graphical user interface. The graphical user interface itself is displayable within a display screen of a data-processing system, such as, for example, a personal computer, a portable computer, a computer workstation and/or a personal digital assistant (PDA). The communications link between the data-processing system and the latch can be implemented as a wire line or a wireless communications link, depending upon desired implementations.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2(*b*), is a pictorial representation of a notebook-based computer system, in which an alternative embodiment of the present invention can be implemented;

DETAILED DESCRIPTION OF THE INVENTION

The particular values and configurations discussed in these non-limiting examples can be varied and are cited merely to illustrate at least one embodiment of the present invention and are not intended to limit the scope of the invention.

Embodiments disclosed herein generally related to a latch diagnostic method, system, and program product are disclosed. Diagnostic data associated with a latch can be generated in response to automatically analyzing the latch. Examples of latches, which can be analyzed and diagnosed according to the embodiments disclosed herein include vehicle door latches. In general, a graphical user interface can be provided for graphically displaying the diagnostic data within a display area thereof. A user can then take advantage of the graphical user interface to debug the latch and determine if additional action is required. A communications link between the graphical user interface and the latch can be implemented over which latch operational and functionality feedback information is communicated to the latch, in response to user input provided to the graphical user interface. The latch can be automatically analyzed in response to user input provided through the graphical user interface. Additionally, the latch can be automatically analyzed during latch operations thereof.

The diagnostic data is generally composed of latch functionality and operational information. The graphical user interface thus facilitates the viewing of latch internal electrical functionality and status data. The latch itself, including functionality and operations thereof, can be modified and improved. in response to communicating latch operational and functionality feedback information to the latch over the communications link from the graphical user interface. The graphical user interface itself is displayable within a display screen of a data-processing system, such as, for example, a personal computer, a portable computer, a computer workstation and/or a personal digital assistant (PDA). The communications link between the data-processing system and the latch can be implemented as a wire line or a wireless communications link, depending upon desired implementations.

Figure 1:
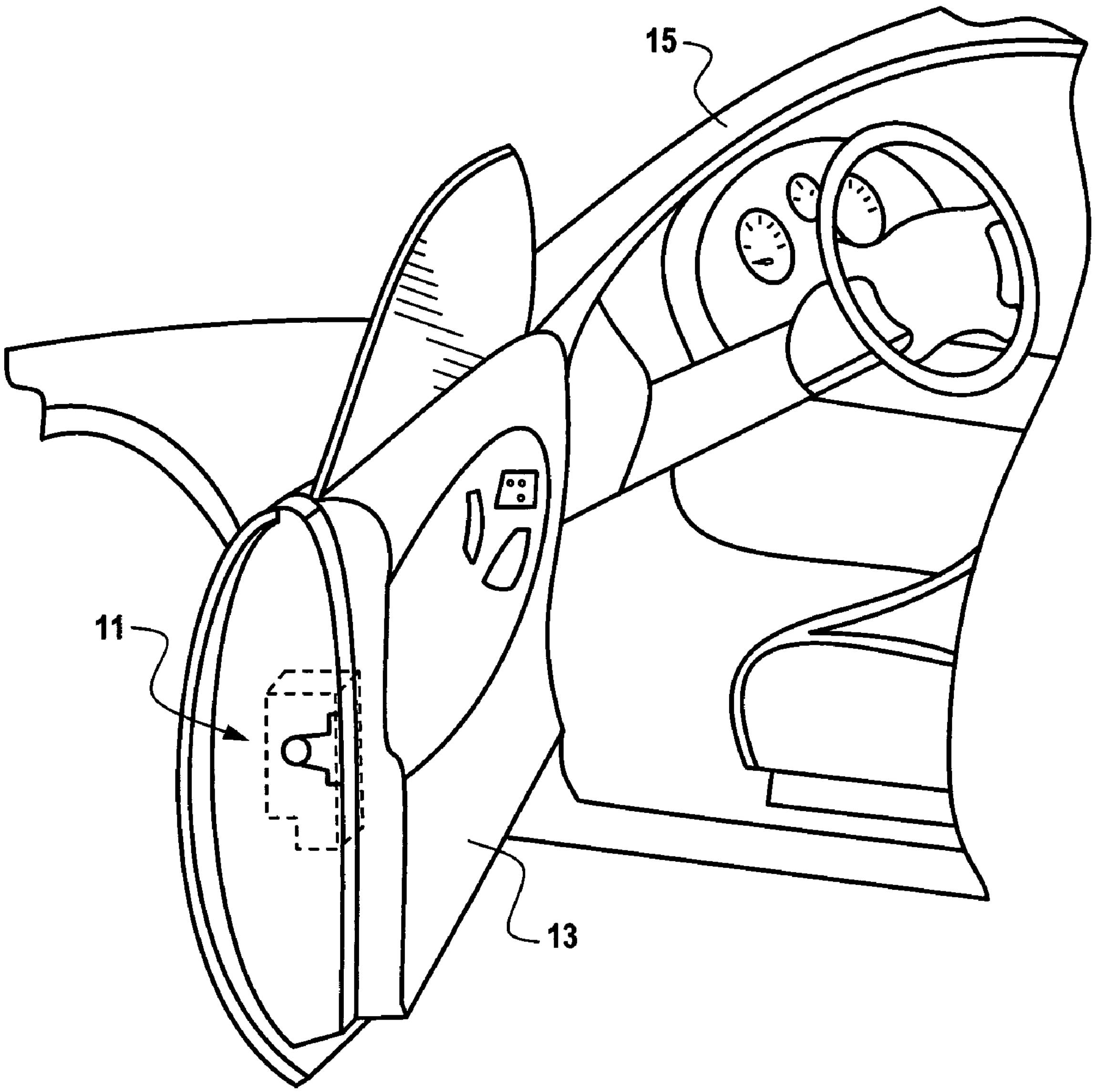
FIG. 1 illustrates a perspective view of a vehicle door mounted to a passenger vehicle in which a preferred embodiment of the present invention can be implemented.

Referring now to FIG. 1, a perspective view of a vehicle door 13 mounted to a passenger vehicle is depicted in which a preferred embodiment can be implemented. A vehicle, such as an automobile can be equipped with one or more individual door latch assemblies 11, which secure respective passenger and driver side doors to the vehicle 15. Each door latch assembly 11 is typically provided with manual release mechanisms or lever for unlatching the door latch from the inside and outside of the vehicle, e.g. respective inner and outer door handles. In addition, many vehicles can also be equipped with electrically controlled actuators for remotely locking and unlocking the door latches. As indicated in FIG. 1, a door latch assembly 11 can be mounted to a driver's side vehicle door 13 of a passenger vehicle 15. The door latch assembly 11 may be mounted to front and rear passenger side doors thereof and may be incorporated into a sliding side door, rear door, a rear hatch or a lift gate thereof, depending upon design constraints.

Figure 2A:
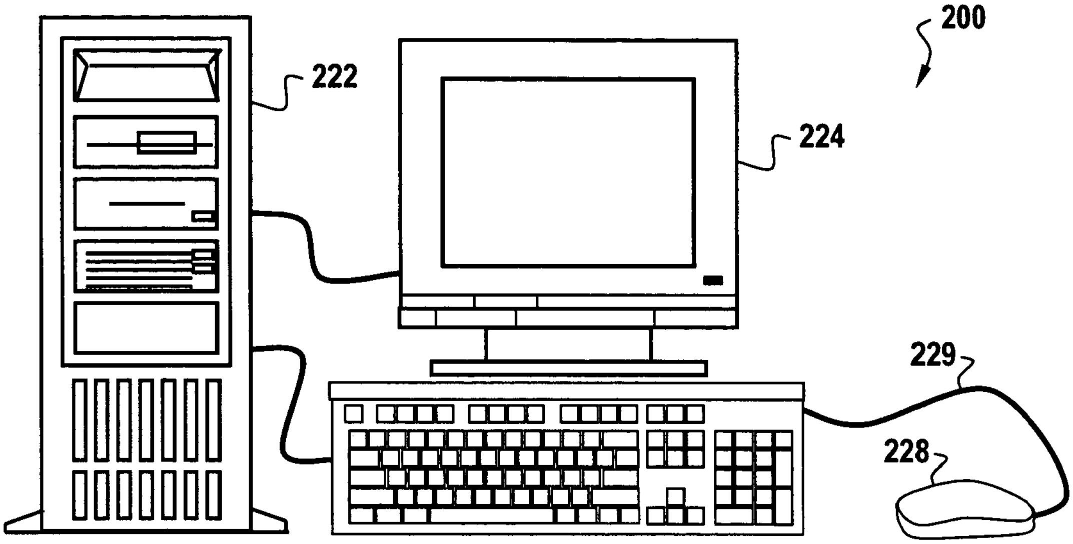
FIG. 2(*a*) illustrates a pictorial representation of a computer system in which one embodiment of the present invention can be implemented.
Figure 2B:
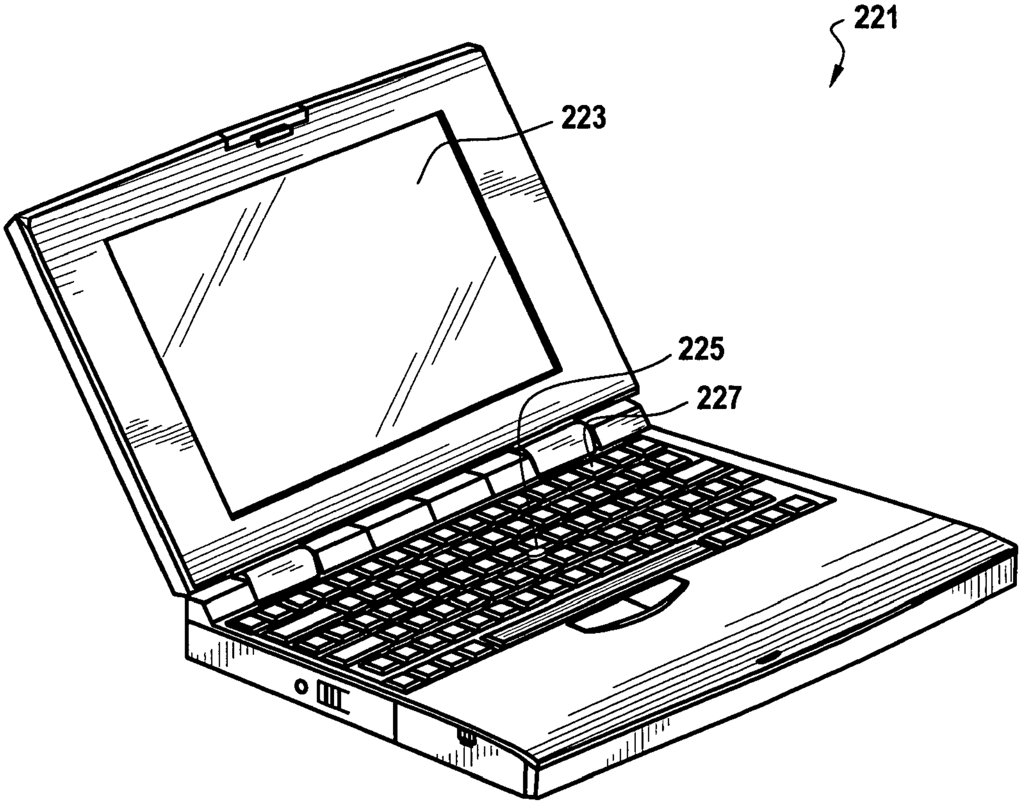

With reference now to the figures and in particular with reference to FIG. 2(*a*), there is depicted a pictorial representation of a data-processing system 220 in accordance with a preferred embodiment of the present invention. Data-processing system 220 can includes a system unit 222, a video display 224, a keyboard 226, and a mouse 228. Data-processing system 220 can be, for example, integrated with the passenger vehicle 15 depicted in FIG. 1. Alternatively, data-processing system 220 can exist as a stand-alone computer system, which communicates remotely with passenger vehicle 15. Data-processing system 220 can therefore be utilized to implement a latch diagnostic method, system, and/or program product as disclosed herein.

Data-processing system 220 can generally be implemented utilizing any suitable computer system or personal computer. Although the depicted embodiment of FIG. 2(*a*) involves a personal computer, alternative embodiments of the present invention can be implemented in the context of other types of data-processing systems, such as, for example, intelligent workstations, mini-computers, a Personal Digital Assistant (PDA), and/or "notebook" computers such as the configuration depicted in FIG. 2(*b*) herein.

Data-processing system 220 can be implemented, for example, as a "laptop" or "notebook" computer, well known in the computer arts. Data-processing system 220 generally includes a graphical user interface that resides within machine-readable media to direct the operation of data-processing system 220. The embodiments disclosed herein can therefore apply equally to any data-processing system, regardless of whether the data-processing system is implemented as a complicated multi-user computing apparatus, a single-user workstation, a portable computer or a PDA.

Keyboard 226 is that part of data-processing system 220 that resembles a typewriter keyboard and which enables a user to control particular aspects of the computer. Because information flows in one direction, from keyboard 226 to system unit 222, keyboard 226 functions as an input-only device. Functionally, keyboard 226 represents half of a complete input/output device, the output half being video display 224. Keyboard 226 includes a standard set of printable characters presented in a QWERTY pattern typical of most typewriters. In addition, keyboard 226 may include a calculator-like numeric keypad at one side and additional specialized keys. Some of these keys, such as the "Control," "cut," and "Shift" keys may be utilized to change the meaning of another key. Other special keys and combinations of keys can be utilized to control program operations or to move either text or cursor on the display screen of video display 224.

Mouse 228 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 229 connects mouse 228 to a computer such as data-processing system 220. By moving mouse 228 on a surface (e.g., a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click."

The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Although mouse 228 is described as a pointing device which may be utilized in accordance with a preferred embodiment of the present invention, those skilled in the art will appreciate that other pointing devices can also be utilized in association with alternative embodiments. Thus, mouse 228 is not a necessary feature of the present invention, but is presented for illustrative purposes only.

FIG. 2(*b*), is a pictorial representation of a notebook-based data-processing system 221, in accordance with an alternative preferred embodiment of the present invention. Those skilled in the computer arts will appreciate that data-processing system 221 is a "notebook" or "laptop" version of data-processing system 220 depicted in FIG. 2(*a*). Data-processing system 221 generally includes a keyboard 227 which is analogous to keyboard 226 depicted in FIG. 1(*a*). FIG. 2(*b*) further includes a video display 223 and a pointing device 225. Pointing device 225 is not a mouse. Instead, pointing device 225 may be implemented as track pointer or other similar pointing device. A touch pad pointing device (not shown) can also be integrated with data-processing system 221 as described herein, or other notebook-based pointing devices.

Figure 3:
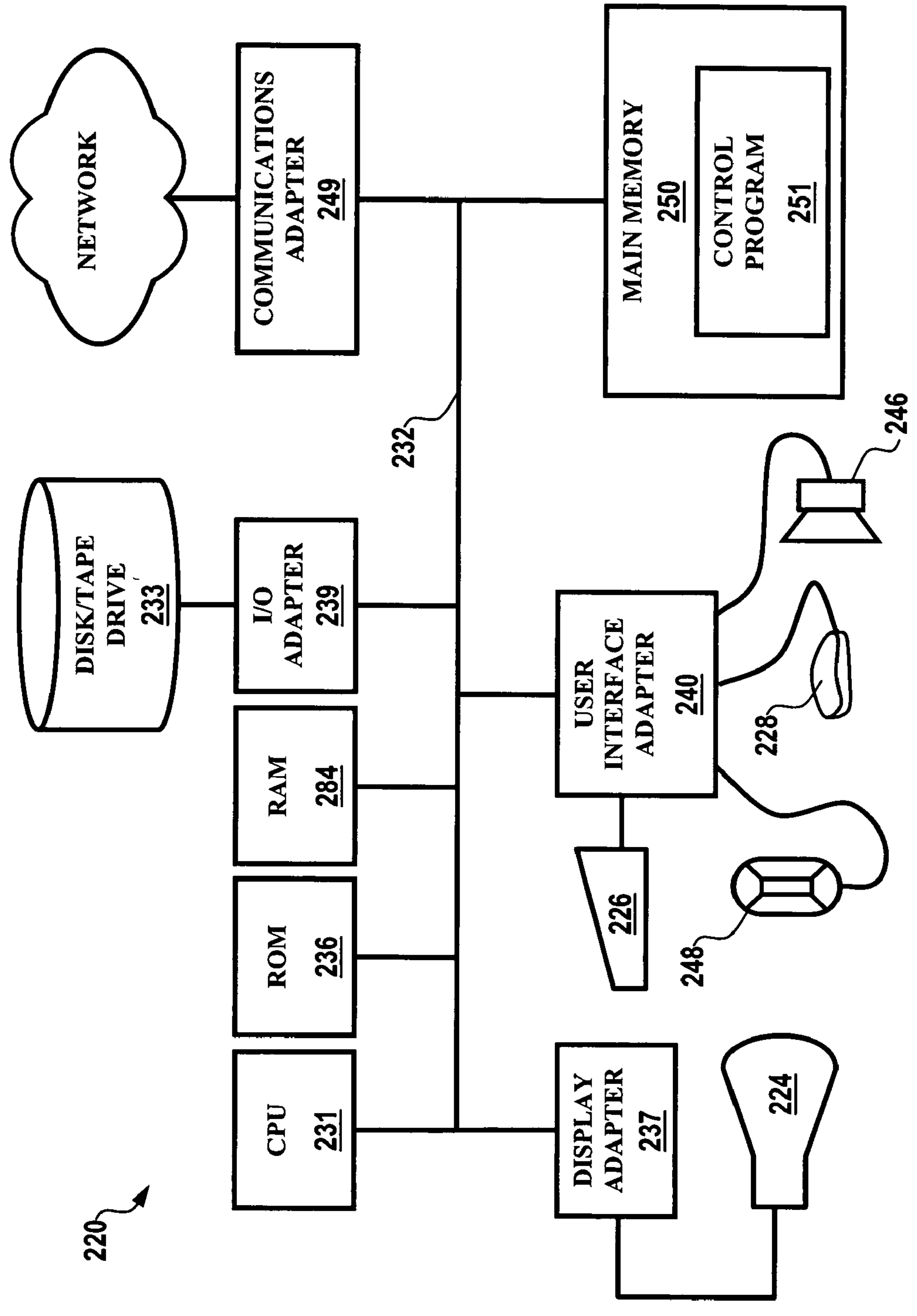
FIG. 3 illustrates a block diagram of a system, which can be implemented in accordance with a preferred embodiment of the present invention.

FIG. 3 depicts a representative hardware environment of data-processing system 220 in which an embodiment of the present invention can be implemented. System unit 222 depicted in FIG. 2(*a*), for example, can include a Central Processing Unit ("CPU") 231, such as a conventional microprocessor, and a number of other units interconnected via system bus 232. Data-processing system 220 includes random-access memory ("RAM") 234, read-only memory ("ROM") 236, display adapter 237 for connecting system bus 232 to video display 224, and I/O adapter 239 for connecting peripheral devices such as disk and tape drives 233 to system bus 232.

Disk and tape drives 233 are electromechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from data-processing system 220. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semi-permanent basis. Because the magnetic coating of the disk must be protected from damage and contamination, a floppy (e.g., 5.25 inch) disk or micro-floppy (e.g., 3.5 inch) disk is encased in a protective plastic jacket. A hard disk, which is very finely machined, is typically enclosed in a rigid case and can be exposed only in a dust free environment.

Video display 224 is the visual output of data-processing system 220. Video display 224 can be, for example, a CRT-based video display well-known in the art of computer hardware. "CRT" is an acronym for cathode-ray tube. With a portable or notebook-based computer such as data-processing system 221 of FIG. 2(*b*), video display 224 can be replaced with an LCD-based or a gas plasma-based flat-panel display. "LCD" is an acronym for liquid crystal display. Those skilled in the art can thus appreciate that data-processing system 220 may be modified to be implemented as a notebook-based computer, such as data-processing system 221 depicted in FIG. 2(*b*).

Data-processing system 220 further includes user interface adapter 240 for connecting keyboard 226, mouse 228, speaker 246, microphone 248, and/or other user interface devices, such as a touch screen device (not shown), to system bus 232. Communications adapter 249 connects data-processing system 220 to a computer network. Although data-processing system 220 is shown to contain only a single CPU and a single system bus, it should be understood that the present invention applies equally to data-processing systems that posses multiple CPUs and to data-processing systems that include multiple buses that each perform different functions in different ways.

Data-processing system 220 also includes a graphical user interface that resides within a machine-readable media to direct the operation of data-processing system 220, or as those skilled in the art will appreciate, data-processing system 221 depicted in FIG. 2(*b*). Any suitable machine-readable media may retain the graphical user interface, such as RAM 234, ROM 236, a magnetic diskette, magnetic tape, or optical disk (the last three being located in disk and tape drives 233). Any suitable operating system and associated graphical user interface (e.g., Microsoft Windows) may direct CPU 231. For example, the Linux operating system, UNIX, MAC, OS, and so forth can also be utilized to direct CPU 231. Other technologies can also be utilized in association with CPU 231, such as touch-screen technology or human voice control. Those skilled in the art will appreciate that the hardware depicted in FIG. 3 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 250 is connected to system bus 232, and includes a control program 251 that resides within main memory 250 and contains instructions that when executed on CPU 231, carry out the operations depicted in the logic flow chart described herein. Control program 251 can, for example, contain instructions such as those depicted in the flow diagram 500 of FIG. 5 herein. The computer program product can also be referred to as a program product. It is important that, while the embodiments have been (and will continue to be) described in the context of a fully functional data-processing system (e.g., computer system), embodiments are capable of being distributed as a program product in a variety of forms, and that such embodiments can apply, equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 4:
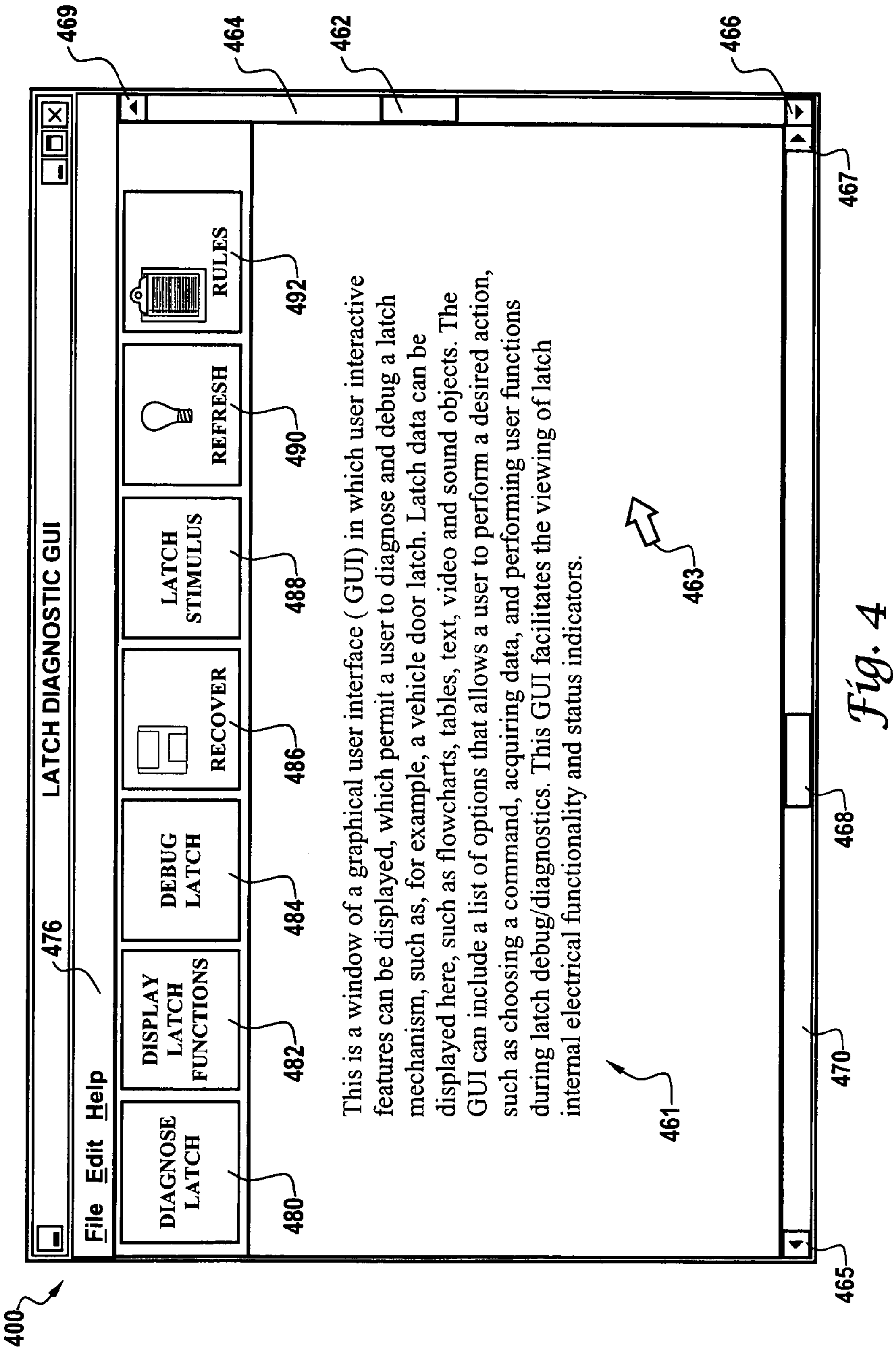
FIG. 4 illustrates a pictorial representation of a graphical user interface window, which can be implemented in accordance with a preferred embodiment of the present invention.

FIG. 4 illustrates a pictorial representation of a graphical user interface window 400, which can be implemented in accordance with a preferred embodiment of the present invention. In general, a graphical user interface is a type of display format, which enables a user to choose commands, start programs, and see lists of files, objects and other options by pointing to pictorial representations and lists of menu items on a computer display screen. Choices can generally be activated by either a keyboard or a pointing device such as a mouse, trackball, touch pad, stylus, and so forth.

A graphical user interfaces can provide a cursor and scroll bar for scrolling through portions of a viewable object. A viewable object is an object that is the focus of a user's attention. A viewable object can contain multiple components such as spreadsheets, text, hotlinks, pictures, sound, and video objects. However, a viewable object is not limited to these components. In many types of graphical user interfaces, a vertical or horizontal bar at the side or bottom of a graphical user interface window can be utilized in conjunction with a pointing device such as a mouse, trackball, or stylus to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

Scrollbars are thus common graphical elements utilized in personal computer user interfaces (i.e., graphical user interfaces). A scrollbar adjusts a value along a range of possible values. Such scrollbars can be utilized to scroll a picture left or right on a display screen, or to adjust the color of an area on the screen, depending on the particular application to which the scrollbar is dedicated. Scrollbars are typically operated with a mouse or other pointing device.

A user can utilize a pointing device to point a displayed cursor at the scrollbar, and then utilize a selection button displayed within the graphical user interface to manipulate the scrollbar via a so-called "click" of the pointing device. Many scrollbars include associated arrows for controlling the scrollbar. In some scrollbar applications, the user can click on a left arrow to decrease a value (i.e., numerical position or coordinates) by a small amount. If the user clicks on the arrow and holds down the pointing device button, then the value will continue decreasing until the button is released. Similarly, a right arrow can increase the value. The slider thus moves left and right as the value changes, in response to user input directed from the pointing device.

Window 400 therefore displays a portion of a viewable object, such as a compound document 461. Window 400 is an area on the display screen of a visual display device such as video display 224 of FIG. 2(*a*) that is utilized to present a view of an object or to conduct a dialog with a user. Such "windows" can be utilized to present objects, action options, messages, and so forth. Compound document 461 is a viewable object that can contain multiple components, such as interactive graphical icons, spreadsheets, text, hotlinks, pictures, sound, and video objects. Examples of objects capable of running within the compound document 461 include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because the compound document 461 can include too large or too many objects to view simultaneously, the user can position a mouse cursor over an arrow section of the window scroll bar and click a pointing device (e.g. a mouse) to scroll the document upward or downward, as appropriate.

The size and position of slider 462 within scroll bar 464 corresponds to the size and position of the current viewable page in relation to compound document 461. The current viewable page is contained within a viewable window area within window 460. Window 460 also includes a menu bar 476. Menu bar 476 is a displayed rectangular bar from which menus can be selected by a user. Those skilled in the art will appreciate that compound document 461 is a document having multiple objects capable of running within the document such as spreadsheets, text, hotlinks, pictures, sounds, and video objects. Other examples of objects capable of running within a compound document such as computer document 461 include graphical representations, spreadsheets, or a collection of text. Names of available menus are displayed within menu bar 476. Choosing a particular menu in response to user input (e.g., mouse or keyboard user input) causes a list of options in the particular menu chosen to be displayed.

Because compound document 461 may include too many pages to view simultaneously, the user can position a cursor pointer 463 over up-arrow 469 or down-arrow 466 of scroll bar 464 and "click" a button on a pointing device such as a mouse to scroll the document upward or downward, as appropriate. Cursor pointer 463 is an on-screen element whose location changes as the user moves the pointing device. Depending on the location of cursor pointer 463 and the operation of the program with which its associated, the area of the screen where cursor pointer 463 appears serves as the target for an action when the user presses a button located on an appropriate pointing device, such as a mouse or a pointing device.

Scrolling in this manner permits viewing of any desired portion of compound document 461. Scrolling is essentially the electronic equivalent of reading through a rolled (i.e., "scrolled") document rather than flipping through pages of a book. Arrows 465, 467 can also be utilized by a graphical user interface user to scroll left or right through compound document 461. Scroll bar 464 is thus a graphical user interface window component, associated with a scrollable area, which indicates to a user that more information is available in a particular direction and can be scrolled into view.

In FIG. 4, the graphical user interface window 400 sizes slider 462 within scroll bar 464 according to the number of pages in compound document 461. The length of slider 462 is small with respect to the length of scroll bar 464, because it represents one of many pages of compound document 461. Similarly, the graphical user interface can position slider 462 within scroll bar 464 relative to the viewable position of compound document 461. For example, the graphical user interface positions slider 462 at the top of scroll bar 464 when the user is viewing the first page of compound document 461, and at the bottom of scroll bar 464 when the user is viewing the last page of compound document 461. Slider 462 on scroll bar 464 is defined to have a minimum size. Scrollbar 470 thus includes a slider 468 and associated arrows 465 and 467. Scrollbar 470 is a horizontal scrollbar while scrollbar 464 acts as a vertical scrollbar.

Graphical user interface window 400 also includes a plurality of graphically displayed buttons 480-492, which permit a user to initiate particular latch operational and/or debugging functionalities. For example, button 480, when activated by a user, initiates latch debugging operations. Button 482, when activated by a user, displays current latch functionalities within the area encompassed by compound document 461. A user can thus view the current status of the latch via window 400 in order to determine what steps, if any, may need to be taken in order to diagnose and/or debug the latch. Button 484, when activated by a user, initiates actual debugging of the latch.

Button 486, on the other hand, when activated by a user, permits latch diagnostic data to recovered and displayed within window 400. Button 488, when activated by a user, permits a latch stimulus to be initiated via window 400. Button 490, when activated by a user, permits information displayed within window 400 to be refreshed. In other words, updated latch diagnostic data can be displayed within the graphical user interface for the user to view when button 490 is activated by the user. Button 492, when activated by the user, permits various latch diagnostic rule data to be displayed within window 400.

Graphical user interface window 400 therefore can be utilized to display all of the internal latch functions and operational status information, and allow for the gathering of latch data during latch operations. Additionally, graphical user interface window 400 can permit data analysis and operation profiling. It can be appreciated that although a few buttons and latch functionalities are indicated by window 400, such a window can be modified to include other latch diagnostic and debugging activities not described or depicted herein.

Figure 5:
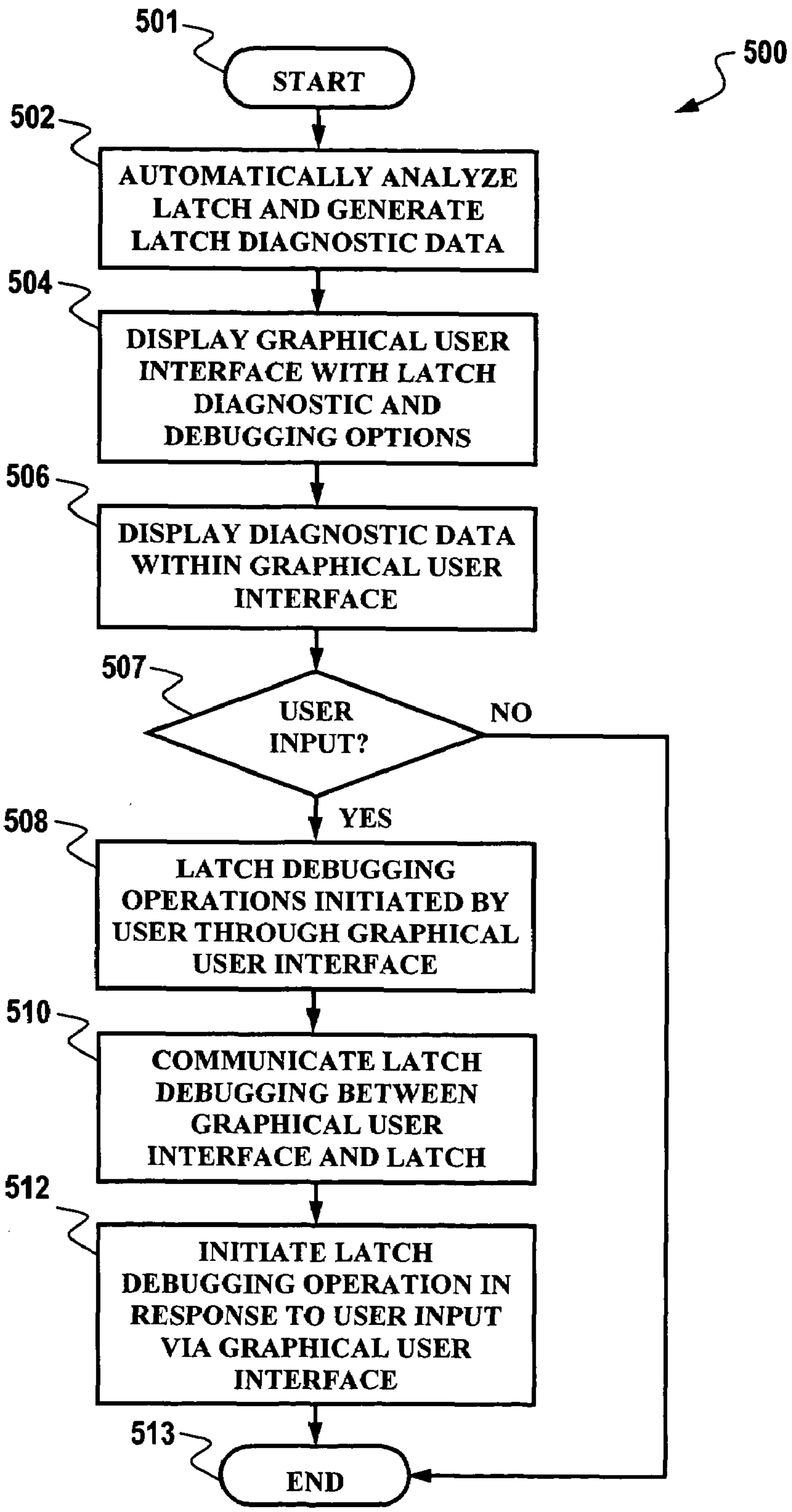
FIG. 5 illustrates a high-level flow diagram depicting logical operational steps that can be implemented in accordance with a preferred embodiment of the present invention.

FIG. 5 illustrates a high-level flow diagram 500 depicting logical operational steps that can be implemented in accordance with a preferred embodiment of the present invention. FIG. 5 generally indicates a self-consistent sequence of steps leading to a desired result. The steps are those requiring physical manipulation, of physical quantities and can be implemented, for example, as a control program, such as control program 351 depicted in FIG. 3. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 220 and/or computer system 221 depicted in FIG. 2(*a*), FIG. 2(*b*), and FIG. 3, in processing electrical or other (e.g. mechanical, chemical) physical signals to generate other desired physical signals.

Thus, as indicated at block 501, the process is initiated. As depicted thereafter at block 502, a latch such as, for example, door latch assembly 11 of FIG. 1, can be analyzed. In response to such an analysis, diagnostic data associated with the latch can be generated. Next, as indicated at block 504, a graphical user interface such as the GUI window 400 depicted in FIG. 4 can be displayed for a user. Such a graphical user interface includes latch diagnostic and debugging options which can be activated by the user. The graphical user interface thus allows for user input, which permits the user to produce latch stimulus.

Next, as depicted at block 506, the diagnostic data associated with the latch can be graphically displayed within a display area of the graphical user interface (e.g., GUI window 400 of FIG. 4). Thereafter, as depicted at block 507, a test can be performed to determine if user input is provided through the graphical user interface. If user input is not provided, then the process simply terminates, as indicated at block 513.

If, however, user input is provided, assuming such input constitutes debugging instructions, a latch debugging operation can be initiated by the user through the graphical user interface, as depicted at block 508. Latch operational and functionality feedback information to the latch can then be communicated to the latch from the graphical user interface, as indicated at block 510, in response to user input provided to the graphical user interface. Note that the connection between the graphical user interface and the latch can be accomplished via any type of data transfer media, such as, for example, wireless communications and/or direct wireline communications, such as, serial communications via a bidirectional serial protocol. Thereafter, as described at block 512, a latch debugging operation can be performed in response to the user input via the graphical user interface. The process can then terminate, as indicated at block 513.

Figure 6:
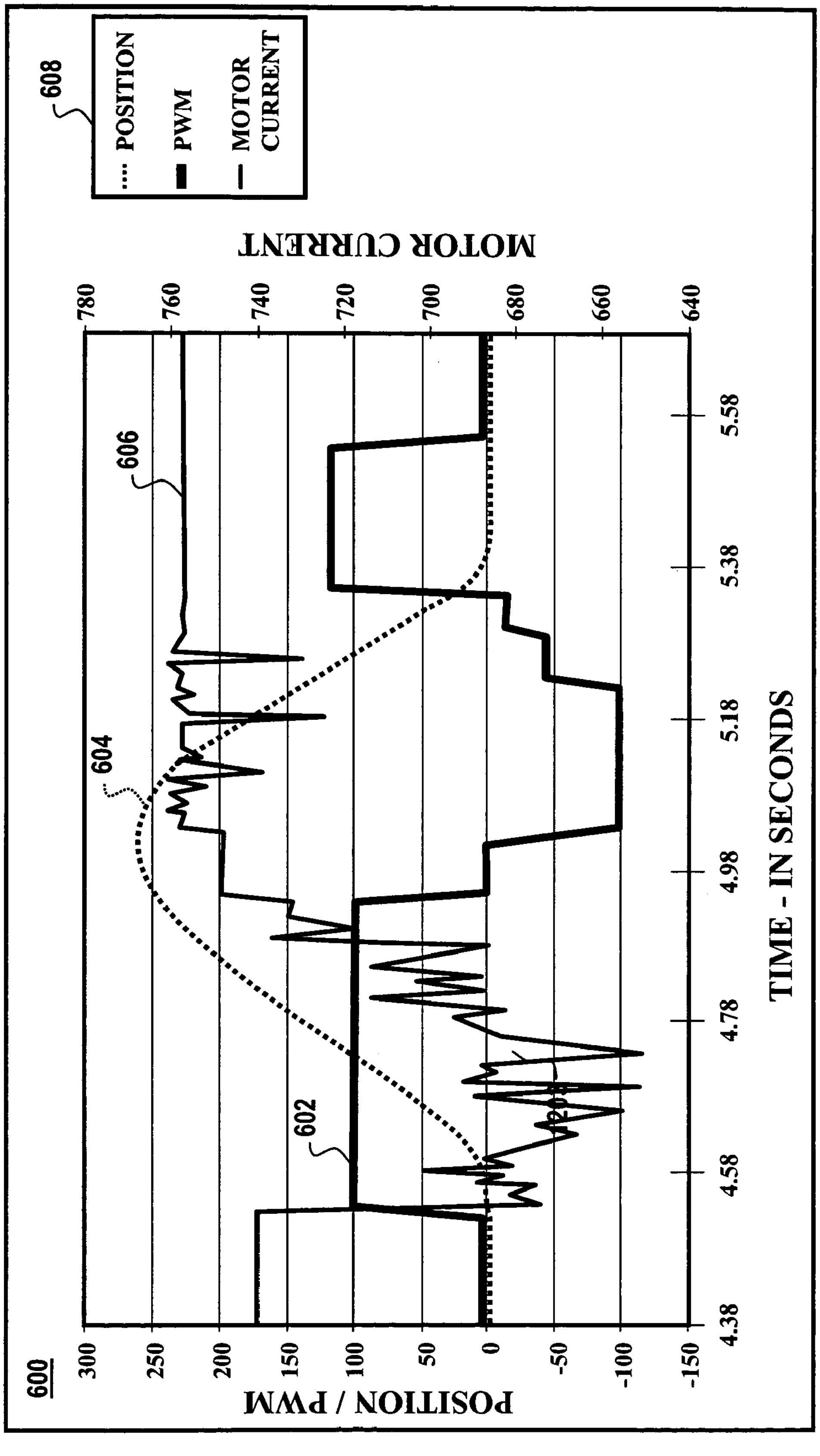
FIG. 6 illustrates a graph indicative of data collected providing motor current, positional feedback information and PWM information, which can be utilized for diagnostic purposes in accordance with an alternative embodiment of the present invention.

FIG. 6 illustrates a graph 600 indicative of data collected providing motor current, positional feedback information and PWM (Pulse Width Modulation) information, which can be utilized for diagnostic purposes in accordance with an alternative embodiment of the present invention. Graph 600 is based on a plot of position/PWM versus time (i.e., in seconds). Graph 600 is associated with a legend 608, which in turn is associated with a PWM control plot line 602, a position control feedback plot line 604 and a latch motor current plot line 606 (i.e., in mAmps). Graph 600 indicates that the diagnostics tools disclosed herein are not limited only to latch diagnostics. The diagnostic functionalities discussed herein can serve, for example, as a diagnostic gateway for a door (e.g., providing diagnostics for a passive entry system, window lift, mirror control, etc.). Thus, the information indicated in graph 600, can for, example, be easily reorganized for use with varying diagnostic purposes.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A latch debugging method, comprising the steps of:

generating diagnostic data associated with a latch, in response to automatically analyzing said latch, wherein said diagnostic data comprises latch internal electrical functionality and status data for debugging of said latch;

graphically displaying said diagnostic data and user interactive features within a display area of a graphical user interface for permitting a user to initiate particular latch operational and debugging functionalities;

initiating a latch debugging operation through said graphical user interface in response to a user input provided to said graphical user interface; and communicating latch debugging operational and functionality feedback information to said latch, in response to said user input provided to said graphical user interface.

2. The method of claim 1 wherein said interactive features comprise a plurality of buttons including a latch stimulus button, and the method further comprising the step of;

producing said latch stimulus in response to activating said latch stimulus button.

3. The method of claim 1 further comprising the step of:

automatically analyzing said latch during latch operations thereof.

4. The method of claim 1 wherein said latch internal electrical functionality and status data comprises motor current, positional feedback and/or pulse width modulation information.

5. The method of claim 1 further comprising the step of:

automatically modifying a functionality and an operation of said latch, in response to communicating latch operational and functionality feedback information to said latch.

6. A latch debugging system, comprising:

a data processor for performing a selected debugging operation on a latch;

diagnostic data associated with said latch, wherein said diagnostic data comprises latch internal electrical functionality and status data for debugging said latch and wherein said diagnostic data is generated in response to automatically analyzing said latch;

a graphical user interface graphically displaying said diagnostic data and user interactive features within a display area thereof, said interactive features permitting a user to diagnose and debug said latch, wherein said latch debugging operation is initiated through said graphical user interface in response to a user input provided to said graphical user interface; and a communications link between said graphical user interface and said latch over which latch debugging operational and functionality feedback information is communicated to said latch, in response to said user input provided to said graphical user interface.

7. The system of claim 6, wherein said interactive features comprise a plurality of graphically displayed buttons including a latch stimulus button, said system producing latch stimulus in response to activation of said latch stimulus button.

8. The system of claim 6 wherein said latch is automatically analyzed during latch operations thereof.

9. The system of claim 6 wherein a functionality and an operation of said latch are automatically modified, in response to communicating latch operational and functionality feedback information to said latch over said communications link.

10. The system of claim 6 wherein said latch internal electrical functionality and status data-comprises motor current, positional feedback and/or pulse width modulation information.

11. The system of claim 6 wherein said latch internal electrical functionality and status data comprises motor current, positional feedback and/or pulse width modulation information versus time.

12. The system of claim 11 wherein said latch is automatically analyzed in response to said graphical user interface receiving a user input.

* * * * *